United States Patent [19]
Jennings

[11] Patent Number: 5,412,712
[45] Date of Patent: * May 2, 1995

[54] MULTIPLE LANGUAGE CAPABILITY IN AN INTERACTIVE SYSTEM

[75] Inventor: Terry D. Jennings, Westminster, Colo.

[73] Assignee: AT&T Corp., Murray Hill, N.J.

[*] Notice: The portion of the term of this patent subsequent to Dec. 20, 2011 has been disclaimed.

[21] Appl. No.: 215,167

[22] Filed: Mar. 21, 1994

Related U.S. Application Data

[63] Continuation of Ser. No. 889,007, May 26, 1992, Pat. No. 5,375,164.

[51] Int. Cl.$^6$ .................... H04M 1/64; G10L 5/00
[52] U.S. Cl. ........................ 379/88; 379/67; 379/89; 364/419.01; 364/419.04; 364/419.08; 434/156; 434/185; 434/308; 381/43; 381/51; 395/2.86
[58] Field of Search ............... 379/67, 88, 89; 364/419.01, 419.02, 419.04, 419.08; 434/157, 156, 307, 308, 185; 340/721; 381/43, 51; 395/2.86

[56] References Cited

U.S. PATENT DOCUMENTS

| | | | |
|---|---|---|---|
| 4,654,798 | 3/1987 | Taki et al. | 434/157 |
| 4,700,322 | 10/1987 | Benbassat et al. | 379/96 |
| 4,882,681 | 11/1989 | Brotz | 364/419 |
| 4,916,730 | 4/1990 | Hashimoto | 379/100 |
| 5,152,003 | 9/1992 | Poch | 364/419 |

Primary Examiner—James L. Dwyer
Assistant Examiner—Fan Tsang
Attorney, Agent, or Firm—Joseph J. Opalach

[57] ABSTRACT

Announcements from a voice messaging system that either prompt a user for action or provide information to a user are constructed independent of the language in which the announcement is provided to the user. In particular, each announcement is treated as a "semantic expression" having an announcement identifier. This announcement identifier is mapped into a plurality of rules, each rule providing instructions on how to construct the announcement for a particular language. The rules can recursively call other rules to provide additional flexibility in constructing a particular announcement.

11 Claims, 2 Drawing Sheets

FIG. 1
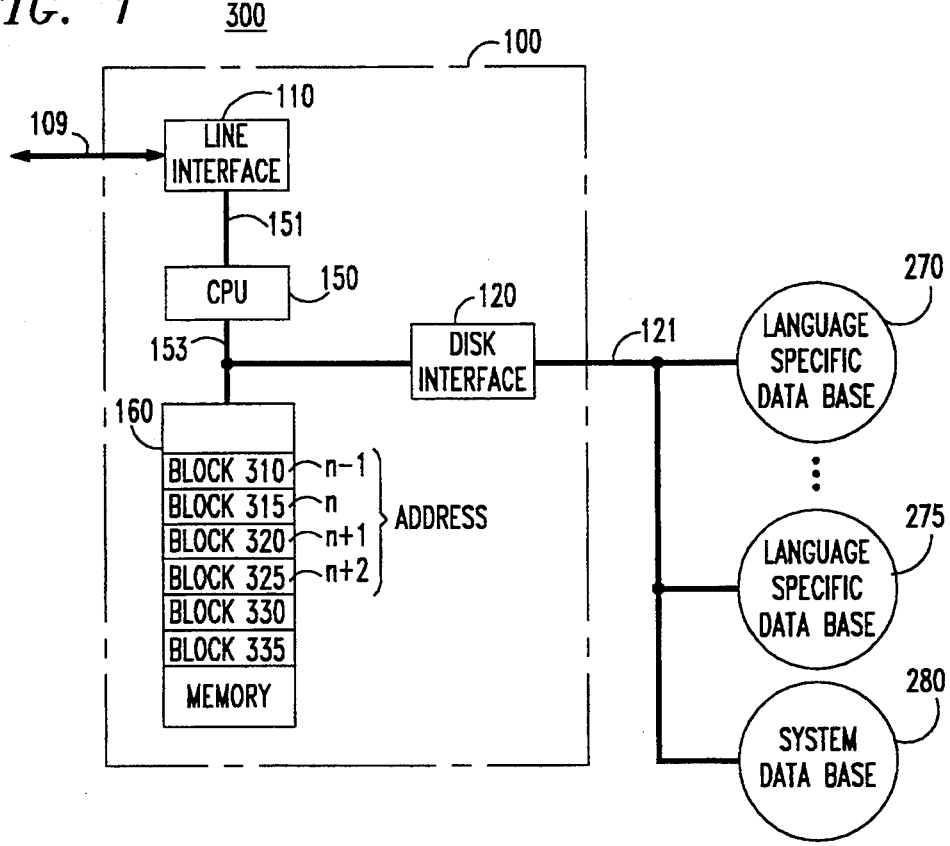
FIG. 2
SEMANTIC EXPRESSION (10)
ANNOUNCEMENT ID
SET OF RULES 20
ENGLISH LANGUAGE SPECIFIC RULE — 21
SPANISH LANGUAGE SPECIFIC RULE — 22
FIG. 3
LANGUAGE SPECIFIC RULE 25
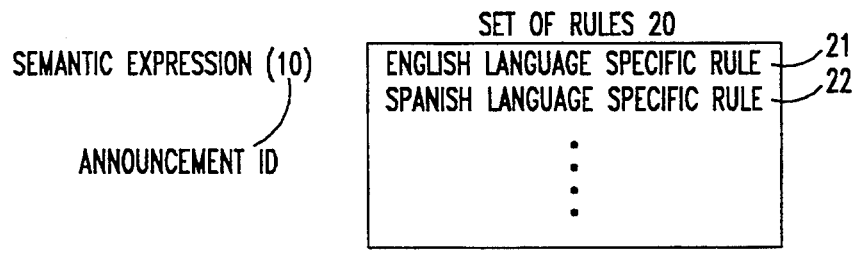
VALUE
ANNOUNCEMENT ID

FIG. 4

RULE 21:
"You have" NUMBER "New voice mail" (if number == 1 "message" else "messages")

RULE 46:
(if NUMBER > 10 "Too big a number of" else "NUMBER")

FIG. 5

RETRIEVE ANNOUNCEMENT ID ASSOCIATED WITH THE DESIRED SEMANTIC EXPRESSION — 310

TRANSLATE THE ANNOUNCEMENT ID INTO A SET OF RULES AND RETRIEVE THE LANGUAGE SPECIFIC RULE FROM THE SYSTEM DATA BASE — 315

EVALUATE THE CONSTRUCTION RULE TO DETERMINE THE PARTICULAR VOICE FRAGMENT TO USE — 320

EVALUATE THE VARIABLE TO DETERMINE THE PARTICULAR VOICE FRAGMENT TO USE — 325

RETRIEVE ALL OF THE LANGUAGE SPECIFIC VOICE FRAGMENTS FROM THE RESPECTIVE LANGUAGE DATA BASE — 330

PLAY BACK THE VOICE FRAGMENTS TO PROVIDE THE ANNOUNCEMENT TO A USER — 335

MULTIPLE LANGUAGE CAPABILITY IN AN INTERACTIVE SYSTEM

This application is a continuation application Ser. No. 07/889007, filed on May 26, 1992, now U.S. Pat. No. 5,375,164.

BACKGROUND OF THE INVENTION

This invention relates to voice messaging techniques used in telephone systems.

Voice messaging telephone systems have grown in popularity over the years and are widely available for use by the public. For example, a visitor at a hotel now has the ability to receive an actual voice message from a calling party through the hotel's telephone system rather than through a hand written message slip from a member of the hotel staff. Another example is in the area of incoming call management systems, where a customer's telephone call is answered by a voice messaging system and the customer is guided by a series of announcements, i.e., voice prompts, to either place an order, receive an account balance, etc.

As described above, in a voice messaging telephone system, an announcement is played back to a user and either prompts a user for action or provides the user with information. The announcement itself may contain system information like time-of-day, which can be used to provide the time when a voice message was recorded to a user of the system. However, in the above examples, it is easy to gloss over an underlying assumption, which is that all the announcements are in one language only. Indeed, if only one language is supported, the design and use of a voice messaging system is simplified since, for example, the sentence structure required for any announcement is known a priori. However, if two languages are required to be supported in a voice messaging system, the complexities of dealing with announcements in different languages increases. This can easily be seen by conceptually comparing the English Language to another language like German, each language having its own rules of sentence construction. In addition, even in countries speaking similar languages, there are variations that need to be taken into account by any voice messaging system in playing back announcements. For example, in the United States, a date has the format of month/day/year, however, in England, the format is day/month/year, yet both countries use the English language.

As a result of language specific variations in sentence structure, etc., the design of any voice messaging system to provide the correct announcement typically results in an implementation that is language specific. For example, in English, the announcement "You have five new voice mail messages," identifies a set of English voice fragments that are played back end-to-end. Voice fragments are used rather than recordings of complete sentences in order to reduce the amount of voice storage in the voice messaging system. In other words, identical voice fragments that appear in different announcements can be shared as opposed to being needlessly duplicated. However, each additional language that is supported in a voice messaging system requires the use of a separate language specific announcement, which identifies the voice fragments associated for that particular language—essentially resulting in another set of announcements for each additional language. Therefore, continuing with the above example, the same message "You have five new voice mail messages," in another language, would identify a different announcement comprising a set of voice fragments, e.g., Spanish voice fragments, to be played back end to end. Consequently, a voice messaging system that supports English cannot be used to also provide Spanish language announcements without further language-specific design modifications to the existing voice messaging system, modifications that take time and incur additional expenses, and which thereby limit the multilingual capability of existing voice messaging systems in an increasingly international marketplace. Further, any change to one announcement, e.g., to change a particular sentence structure, may have to be repeated in all language versions of that announcement.

SUMMARY OF THE INVENTION

According to the principles of this invention, a voice messaging system is constructed which is language independent. In particular, announcements are organized as "semantic expressions," each of which is used to determine any particular set of language specific voice fragments that are then played back to a user.

In an embodiment of the invention, a voice messaging system comprises a plurality of language specific data bases, a system data base, and a processor. Each of the language specific data bases stores a collection of language specific voice fragments. In addition, each announcement in the system is associated with an identifier, such as a number, that is independent of the language the announcement is to be played back in. For example, the announcement "You have five new voice mail messages," is represented by a number that represents this semantic expression. The processor translates this number to a set of rules, which are stored in the system data base, and uses that rule associated with the desired language to determine the particular set of language specific voice fragments to play back to a user.

In accordance with a feature of the invention, the voice messaging system can be upgraded to support announcements in other languages by merely adding a language specific data base and updating the set of rules on the system data base.

BRIEF DESCRIPTION OF THE DRAWING

FIG. 1 is a block diagram of a voice messaging system embodying the principles of the invention;

FIG. 2 is an illustration of a semantic expression embodying the principles of the invention;

FIG. 3 is an illustration of a language specific rule used in the voice messaging system of FIG. 1;

FIG. 4 is an illustration of an English language rule used in the voice messaging system of FIG. 1; and FIG. 5 is a flow diagram of a method embodying the principles of the invention.

DETAILED DESCRIPTION

FIG. 1 shows a block diagram of a voice messaging system that embodies the inventive concept of this invention. The individual components of the voice messaging system are well-known and are not described in detail.

Voice messaging system 300 comprises processor 100, English language data base 270, Spanish language data base 275, and system data base 280. Processor 100 includes line interface 110, disk interface 120, CPU 150, memory 160, and paths 151 and 153. Paths 151 and 153 represent typical control and data paths used for the interchange of data between the various system components. Line interface 110 is the interface between CPU 150, via path 151, and telephone line 109, which is representative of one of a plurality of voice connections to a telephone switching system (not shown). Each voice connection is used to play back an announcement, in a particular language, to a user. Disk interface 120 is the interface between CPU 150, via path 153, and language data bases 270, 275 and system data base 280, via path 121. Each of the language data bases comprise a set of language specific voice fragments, each voice fragment is a portion of speech in a particular language. System data base 280 stores system specific information. CPU 150 is a microprocessor central processing unit, which operates on, or executes, program data stored in memory 160, via path 153. CPU 150 applies and controls the playback of a particular language specific announcement to telephone line 109. Memory 160 comprises a number of storage locations, of which a subset is shown in FIG. 1. In each storage location, data representative of the program, i.e., program data, is stored. Further, the storage locations shown are only representative, e.g., the storage location for block 3 10 may actually comprise additional storage locations that are needed to store a program representative of block 310.

In voice messaging system 300, each announcement is associated with a "semantic expression," having an announcement identifier, such as a number (announcement ID), e.g., a semantic expression having announcement ID 10 is shown in FIG. 2. In addition, each announcement ID, in turn, is associated with a set of rules. For example, an announcement ID may be a part of a "data structure," which is a well-known programming technique, the data structure including a pointer to the associated set of rules. As a result, the announcement ID is translated into the associated set of rules. Each rule, in the associated set of rules, comprises language specific information. This is shown in FIG. 2, where announcement ID 10 is associated with set of rules 20 comprising two rules—English language rule 21 and Spanish language rule 22. Each language specific rule is used by CPU 150 to calculate a set of language specific voice fragments to associate with a semantic expression. The set of rules, for each announcement ID, is stored on system data base 280.

Each language specific rule comprises language specific information that includes any amount of: voice fragment information, variable information, and language specific construction information. This is shown in FIG. 3 for illustrative rule 25. Voice fragment information is included within quotes, e.g., "voice fragment 1." A voice fragment corresponds to the recorded portion of voice data to be taken from a respective language data base.

Variable information is illustrated by the use of capital letters, e.g., VARIABLE 1. A VARIABLE includes two components. The first component of a VARIABLE is the value of the VARIABLE, this value may be used in the language specific construction of the rule. The second component of a VARIABLE is an announcement ID. This announcement ID is just another semantic expression that determines which language specific voice fragment to use depending on the value of the VARIABLE. In other words, each language specific rule can recursively call another semantic expression in order to provide a voice fragment for the value of the VARIABLE. This allows the substitution of the respective voice fragment for the value of the VARIABLE to be language dependent. In fact, this allows a voice messaging system to easily handle any additional language nuances presented by variable information.

The language specific construction information is included within parentheses, e.g., (construction rule), and reflects the fact that a language specific voice fragment is dependent upon the value of a VARIABLE in that rule. This provides additional flexibility for varying the content of an announcement. For example, a dependency may exist on the whether the value of a VARIABLE is greater than one. If the value is greater than one, a voice fragment representing a "plural" language expression is used. While if the value is equal to one, a voice fragment representing a "singular" language expression is used.

The flow diagram shown in FIG. 5 is a method representing the inventive concept. As illustration, it is assumed that a user connected via telephone line 109 is waiting to receive information, i.e., an announcement from voice messaging system 300. The particular language to use for a particular announcement can be determined, a priori, in a number of ways, e.g., by the type of voice messaging service provided by voice messaging system 300, by the location of the telephone line on which an incoming telephone call appears, etc. In this example, it is assumed, for simplicity, that for a telephone call on telephone line 109 CPU 150 must provide an English language announcement that is representative of a semantic expression having the announcement ID 10, which is shown in FIG. 2. In order to construct this announcement, CPU 150 retrieves, i.e., reads from memory, the announcement ID identified with this semantic expression, i.e., ID=10 (block 310). CPU 150 then translates this number to identify the set of rules associated with this semantic expression. As a result, as shown in FIG. 2, CPU 150 translates the announcement ID 10 to identify set of rules 20. From this set of rules, each particular language specific rule is associated with a given "offset" into the set of rules. In this example, as shown in FIG. 2, the English language rule is the first rule in the set of rules with a resulting offset that is defined as one, a Spanish language rule would have an offset equal to two. Therefore, CPU 150 retrieves the first rule, which is rule 21, from the set of rules 20 stored on system data base 280 (block 315). Rule 21 is then processed by CPU 150 to construct an English language announcement of the semantic expression identified by announcement ID 10. Rule 21 is illustrated in FIG. 4. As can be seen from FIG. 4, rule 21 comprises two voice fragments, one VARIABLE and one construction rule.

First, CPU 150 evaluates the construction rule based on the value of NUMBER. The construction rule is represented as a simple "if then else" statement. If the value of NUMBER is equivalent to one, then CPU 150 will use the language specific voice fragment associated with "message." If the value of NUMBER is not equivalent to one, then CPU 150 will use the language specific voice fragment associated with "messages" (block 320). For this example, it will be assumed the value of NUMBER is equal to five. As a result, the voice fragment associated with "messages" is used.

Second, CPU 150 determines the voice fragment to use for the value of NUMBER. As mentioned above, NUMBER also has associated with it an announcement ID, which in turn has an associated set of rules. A representative English language rule for NUMBER is shown in FIG. 4 as rule 46. This rule comprises only a construction rule. If the value of NUMBER is greater than 10, CPU 150 will use the language specific voice fragment associated with "too big a number of." If the value of NUMBER is ten or less, then CPU 150 will use the language specific voice fragment associated with the value of NUMBER, e.g., "five" (block 325). It should be noted that although a separate evaluation step is shown in FIG. 5 to provide the voice fragment associated with the value of NUMBER, the method of FIG. 5 can be modified to be recursively executed by CPU 150 to provide this voice fragment since a VARIABLE has an associated announcement ID. In other words, the evaluation of VARIABLE can be treated as just another announcement.

After determining the voice fragments to use for any construction rules or VARIABLES contained within a language specific rule, CPU 150 then retrieves from the language specific data base all of the voice fragments, and combines them in the order indicated by the rule to create the language specific announcement. In the context of this example, CPU 150 will retrieve the following voice fragments from English language data base 270: "You have" "five" "new voice mail" "messages" (block 330). This English language announcement is then played back, or broadcast, via telephone line 109, to the user (block 335).

In the context of the flow diagram of the method shown in FIG. 5, the steps performed by CPU 150 are stored in memory 160, beginning at location n−1, and operated on, or executed, by CPU 150. For example, as described above, CPU 150 executes a program comprising program data representative of block 310 at memory location n−1 and then executes program data representative of block 315 at memory location n, etc. As a result, FIG. 1 shows how the illustrative method of FIG. 5 is implemented in voice messaging processor 100.

In accordance with a feature of the invention, the use of a semantic expression to represent a type of announcement allows the design of voice messaging system 300 to be independent of the actual language used to provide the announcement. If a new language needs to be supported, a language specific voice fragment data base merely needs to be added along with an update to the sets of rules stored on system data base 280.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although a preferred embodiment of the invention is for the construction of language specific voice announcements, it should be realized that an announcement can be provided in other forms of language dependent output by a voice messaging processor embodying the inventive concept. As illustration, voice messaging system 300 can provide a language specific announcement in a written form, i.e., language dependent text. In the context of FIG. 1, line 109 is now representative of one of a plurality of terminal connections, e.g., EIA standard RS-232, over which CPU 150 provides the language dependent text to computer terminals or printers (not shown). A similar method to the one shown in FIG. 5 is used by CPU 150, except that the selected voice fragments described above are replaced by the representative text of a voice fragment, an example of which is shown in rule 21 of FIG. 4. In this case, there may be no need to access the language specific data bases since, as illustrated in FIG. 4, the representative text for a particular language dependent message identifies the particular voice fragment to retrieve. As a result, once all of the voice fragments have been identified, instead of retrieving the selected voice fragments from the language specific data base, the representative text is applied by CPU 150 to line 109.

Finally, although separate data bases are illustrated in the above examples, those in the art will appreciate that one physical data base may be used, which is then partitioned to separately store the language specific information and the system information.

I claim:

1. A multi-lingual voice messaging system comprising:
    means for storing a set of announcements, each announcement represented by an identifier that is associated with a plurality of rules, each rule associated with a different language and representing a plurality of words;
    means for storing a plurality of language specific data bases, each language specific data base comprising a plurality of language specific output information;
    means for constructing a language specific announcement from one of the announcements in one of the particular languages by using one of the associated plurality of rules to select some of the plurality of language specific output information where the one of the plurality of rules is associated with said one of the particular languages; and
    means for providing the selected language specific output information to a user;
    wherein the plurality of language specific output information is a plurality of language specific voice fragments and the means for providing plays the selected plurality of language specific voice fragments to provide the language specific announcement to the user.

2. The apparatus of claim 1 wherein said voice fragments are obtained from the data base of the particular language.

3. The apparatus of claim 1 wherein at least one of the plurality of rules comprises a representation of a voice fragment, a variable, and a construction rule, wherein the variable includes an identifier associated with another announcement.

4. A voice messaging system for providing announcements in a plurality of languages, the system comprising:
    first means for storing a plurality of language specific data bases, each data base representing one of the plurality of languages, each language specific data base comprising a plurality of voice fragments;
    second means for storing a set of announcements, each announcement represented by an identifier, each identifier associated with a plurality of words in a different plurality of rules, each rule associated with one of the plurality of languages;
    means for constructing a language specific announcement from one of the announcements in one of the plurality of languages by selecting some of the respective plurality of voice fragments in that language from the first means for storing; and
    means for playing the selected language specific voice fragments to provide the language specific announcement to a user;

where the selected voice fragments are identified by one of the plurality of rules associated with the announcement in the one of the plurality of languages.

5. The apparatus of claim 4 wherein at least one of the rules comprises a representation of a voice fragment, a variable, and a construction rule.

6. A method for providing announcements in multiple languages comprising the steps of:

storing a set of announcements, each announcement represented by an identifier, each identifier associated with a plurality of rules, each rule associated with a plurality of words in a different language and including a representation of a plurality of voice fragments in the language;

providing a plurality of language specific data bases, each language specific data base comprising the plurality of language specific voice fragments;

selecting one of the set of announcements to provide as output to a user in one of the plurality of languages;

constructing a language specific announcement in the one of the plurality of languages by providing the plurality of voice fragments represented in the one of the plurality of rules associated with the one of the plurality of languages for the selected announcement; and providing the language specific announcement to the user.

7. The method of claim 6 wherein the language specific output information is a language specific voice fragment and the providing step plays the plurality of language specific voice fragments to provide the announcement in the selected one of said languages to the user.

8. A method for providing an announcement in a selected one of a plurality of languages, the method comprising the steps of:

retrieving an announcement identifier associated with the announcement;

translating the announcement identifier to retrieve a plurality of rules, each one of the plurality of rules associated with a plurality of words in a respective different one of the plurality of languages;

selecting one of the plurality of rules associated with the selected one of the plurality of languages;

constructing the announcement in the selected one of the plurality of languages by selecting a plurality of voice fragments in accordance with the selected one of the plurality of rules; and providing the selected plurality of voice fragments to a user.

9. The method of claim 8 wherein the selected one of the plurality of rules includes information representative of a voice fragment, variable and construction information, and wherein the constructing step includes:

processing the construction information to select a first portion of the selected plurality of voice fragments;

processing the variable information to select a second portion of the selected plurality of voice fragments;

selecting a third portion of the selected plurality of voice fragments based upon the voice fragment information in the one of the plurality of rules; and combining the first, second, and third portions to provide the selected plurality of voice fragments.

10. The method of claim 9 wherein the variable information includes a second announcement identifier associated with a second announcement.

11. The method of claim 10 wherein the processing the variable information step includes the steps of:

translating the second announcement identifier to retrieve a second set of rules for the second announcement, the second set of rules comprising a plurality of rules, each one of the plurality of rules associated with a respective one of the plurality of languages;

selecting one of the plurality of rules associated with the selected one of the plurality of languages;

constructing the second announcement in the selected one of the plurality of languages by selecting a plurality of voice fragments in accordance with the selected one of the plurality of rules; and providing the selected voice fragments as the second portion of the selected plurality of voice fragments.

* * * * *